United States Patent
Leonard et al.

(10) Patent No.: US 9,051,864 B2
(45) Date of Patent: Jun. 9, 2015

(54) SYSTEM AND PROCESS FOR STORING AN ADDITIVE AND INJECTING IT INTO THE EXHAUST GASES OF AN ENGINE

(75) Inventors: Stephane Leonard, Brussels (BE); Ignacio Garcia-Lorenzana, Brussels (BE); Jean-Baptiste Gouriet, Evere (BE); Dominique Madoux, Rumes (BE); Claude Mesjasz, Ganshoren (BE); Philippe Marechal, Brussels (BE); Volodia Naydenov, Louvain-la-Neuve (BE); Jean-Christophe Lemaire, Jaux (FR)

(73) Assignee: INERGY AUTOMOTIVE SYSTEMS RESEARCH (Société Anonyme), Brussels (BE)

( * ) Notice: Subject to any disclaimer, the term of this patent is extended or adjusted under 35 U.S.C. 154(b) by 0 days.

(21) Appl. No.: 13/264,131

(22) PCT Filed: Apr. 16, 2010

(86) PCT No.: PCT/EP2010/055017
§ 371 (c)(1),
(2), (4) Date: Oct. 12, 2011

(87) PCT Pub. No.: WO2010/119116
PCT Pub. Date: Oct. 21, 2010

(65) Prior Publication Data
US 2012/0047880 A1   Mar. 1, 2012

(30) Foreign Application Priority Data

Apr. 16, 2009 (FR) .................... 09 52502
Jun. 11, 2009 (FR) .................... 09 02837

(51) Int. Cl.
*F01N 3/00* (2006.01)
*F01N 3/10* (2006.01)
*F01N 3/20* (2006.01)

(52) U.S. Cl.
CPC ............ *F01N 3/208* (2013.01); *F01N 2610/02* (2013.01); *F01N 2610/14* (2013.01);

(Continued)

(58) Field of Classification Search
CPC . F01N 3/028; F01N 2610/02; F01N 2610/14; F01N 2610/1406; F01N 2610/142; F01N 2610/1426; F01N 2610/1433; F01N 2610/144; F01N 2610/261; F01N 2610/1473; F01N 2610/1493; F01N 3/208
USPC .................................... 60/286, 295, 301, 303
See application file for complete search history.

(56) References Cited

U.S. PATENT DOCUMENTS 7,000,381 B2 * 2/2006 Maisch ........................... 60/286
2007/0130918 A1 6/2007 Cueman et al.

(Continued)

FOREIGN PATENT DOCUMENTS

CN   101326347 A   12/2008
DE   102006061731 A1   7/2008

(Continued)

OTHER PUBLICATIONS

U.S. Appl. No. 12/513,780, filed May 6, 2009, Philippe Lucien Valmy Georis, et al.

(Continued)

*Primary Examiner* — Audrey K Bradley
(74) *Attorney, Agent, or Firm* — Oblon, McClelland, Maier & Neustadt, L.L.P.

(57) ABSTRACT

A system and a process for storing an additive solution and injecting it into the exhaust gases of an internal combustion engine. The system comprises at least one tank for storing the additive, one pump equipped with an inlet and an outlet and that is capable of generating a direct flow (in injection mode) or a reverse flow (in drawing off mode), at least two additive solution suction points, and an injector, wherein a first suction point is connected to the pump inlet and is only active when the pump operates in injection mode, and wherein the second suction point is connected to the pump outlet and is only active when the pump operates in drawing off mode.

10 Claims, 5 Drawing Sheets

(52) U.S. Cl.
CPC .......................... *F01N2610/1406* (2013.01); *F01N 2610/1433* (2013.01); *F01N 2610/144* (2013.01); *F01N 2610/1493* (2013.01); *Y02T 10/24* (2013.01)

(56) References Cited

U.S. PATENT DOCUMENTS

| | | | |
|---|---|---|---|
| 2009/0101656 A1 | 4/2009 | Leonard | |
| 2009/0230136 A1 | 9/2009 | Dougnier et al. | |
| 2010/0018594 A1 * | 1/2010 | Bruhn et al. | 137/565.11 |
| 2010/0319326 A1 | 12/2010 | Haeberer et al. | |

FOREIGN PATENT DOCUMENTS

| | | | | |
|---|---|---|---|---|
| DE | 102007005006 A1 * | 8/2008 | | F02M 25/00 |
| EP | 0 928 884 A2 | 7/1999 | | |
| FR | 2879239 A1 | 6/2006 | | |
| FR | 2902136 A1 | 12/2007 | | |
| WO | WO 2004/003371 A1 | 1/2004 | | |
| WO | WO 2006/064028 A1 | 6/2006 | | |
| WO | WO 2007141312 A1 | 12/2007 | | |
| WO | WO 2008006840 A1 | 1/2008 | | |
| WO | WO 2008017673 A1 | 2/2008 | | |
| WO | WO 2008058977 A1 | 5/2008 | | |
| WO | WO 2008/080692 A1 | 7/2008 | | |
| WO | WO 2008/092613 A1 | 8/2008 | | |
| WO | WO 2008155303 A1 * | 12/2008 | | F01N 3/20 |
| WO | WO 2009037340 A1 | 3/2009 | | |
| WO | WO 2009090101 A1 | 7/2009 | | |
| WO | WO 2011064076 A1 | 6/2011 | | |

OTHER PUBLICATIONS

U.S. Appl. No. 12/677,632, filed Mar. 11, 2010, Joel Op De Beeck, et al.

U.S. Appl. No. 12/812,914, filed Feb. 18, 2011, Jean-Baptiste Gouriet, et al.

Search Report issued Mar. 6, 2013 in Chinese Application No. 201080016273.5 (English Translation).

* cited by examiner

SYSTEM AND PROCESS FOR STORING AN ADDITIVE AND INJECTING IT INTO THE EXHAUST GASES OF AN ENGINE

CROSS-REFERENCE TO RELATED APPLICATIONS

This application is a U.S. national stage entry under 35 U.S.C. §371 of International Application No. PCT/EP2010/055017 filed Apr. 16, 2010, which claims priority to French Patent Application No. 09.52502 filed Apr. 16, 2009 and to French Patent Application No. 09.02837 filed Jun. 11, 2009, the whole content of these applications being herein incorporated by reference for all purposes.

TECHNICAL FIELD OF THE INVENTION

The present invention relates to a system and process for storing an additive and injecting it into the exhaust gases of an engine.

BACKGROUND OF THE INVENTION

The change in legislation relating to emissions from diesel vehicles especially stipulates a significant reduction in releases of nitrogen oxide in exhaust gases. The SCR (Selective Catalytic Reduction) process in which nitrogen oxides (NOx) are reduced by ammonia is one of the technologies of choice for achieving this pollution control objective. An ammonia precursor solution (generally a solution of urea) is then injected into an exhaust line upstream of the SCR catalyst.

In a known manner, the urea solution is stored in at least one tank and it is pumped from a suction point located in one tank, then it is injected into the exhaust gases.

In the case of an SCR system comprising two tanks for storing the urea solution (for example a storage or passive tank (generally unheated) and a main or active tank (which feeds the injector and which is generally heated)), the two tanks may be connected to one another via a transfer pump that enables liquid to be transferred from the passive tank to the active tank. The system also comprises a main pump capable of pumping liquid at a suction point of the active tank and of injecting it into the exhaust gases via an injection line connected to an injector. The SCR system therefore comprises two pumps, the main pump and the transfer pump.

Such an architecture has several drawbacks: a cost premium associated with the presence of a transfer pump, recourse to supplementary electrical connections and the complexity of a control system likely not to actuate the transfer pump when the latter or the storage tank is frozen.

In the case of an SCR system comprising a single tank, the latter may have a complex architecture comprising volumes in which it is difficult to suck up the additive from a single suction point. Such an architecture is encountered, for example, in a saddle tank comprising a main pocket and a secondary pocket. The additive can then be pumped at several locations of the tank, such as for example at a main suction point located in the main pocket and at a secondary suction point located in the secondary pocket. The additive which is pumped from the main pocket by means of a main pump is then sent to the exhaust gases whilst the additive which is pumped from the secondary pocket by means of a secondary pump is conveyed to the main pocket.

In particular, the secondary suction point may be located at a low point of the tank. Such a situation may occur in architectures where the tank comprises a submerged mounting plate (as described in Application WO 2007/141312 in the name of the Applicant, the content of which is, for this purpose, incorporated in the present application) located in a "low" point of a storage tank that has a zone from which it is difficult to draw off (i.e. in fact: lower than the zone where the mounting plate is located). The additive can then be pumped from this secondary suction point via a secondary pump located, for example, in a return line and be sent to a zone of the tank different from that where the submerged mounting plate is located.

Preferably, the secondary pump is a jet pump and more preferably, a jet pump actuated by the main pump either directly (by a tapping off of its main flow for this purpose only), or indirectly (by a return line which returns to the tank the excess additive not sent to the injector). In injection mode, the additive is pumped by the main pump at a suction point in the tank, it circulates between the inlet and outlet of the pump, then it is sent into an injection line leading to an injector. The excess additive flow is sent into the return line. In such an architecture, the secondary suction point is connected directly to the jet pump through a suction line. In the return line, the excess additive pumped by the main pump primes the jet pump so that the additive located, for example, at a low point of the tank may be sucked up using the jet pump and be conveyed to the main pocket of the tank.

Preferably, the return line comprises a non-return valve located upstream of the secondary pump so that the liquid which is sucked up from the secondary pocket via the secondary pump is not recirculated to the injection line but is directly recirculated to the main pocket of the tank.

Such a system may be developed independently of the system according to the invention.

SUMMARY OF THE INVENTION

The present application aims to improve the systems described above using a system that comprises a main pump, without a supplementary secondary pump, and also, optionally, standard components (non-return valve, calibrated orifice) in order to suck up liquid at least two suction points.

Hence, the present invention relates to a system for storing an additive solution and injecting it into the exhaust gases of an internal combustion engine, said system comprising at least one tank for storing the additive, one pump equipped with an inlet and an outlet and that is capable of generating a direct flow (in injection mode) or a reverse flow (in drawing off mode), at least two additive solution suction points and an injector, characterized in that a first suction point is connected to the pump inlet and is only active when the pump operates in injection mode and in that the second suction point is connected to the pump outlet and is only active when the pump operates in drawing off mode.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1:
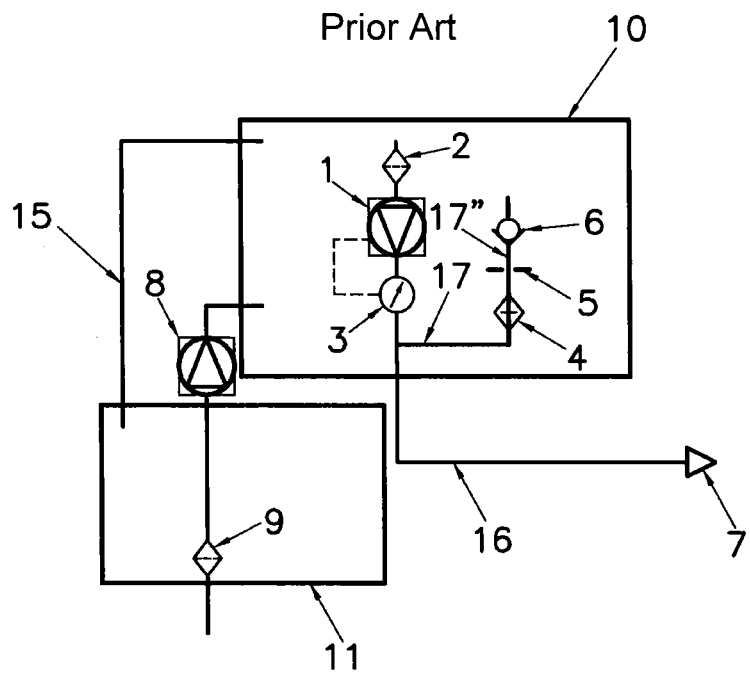
FIG. 1 illustrates a system according to the prior art comprising a storage (passive) tank and an active tank connected to one another.

The additive in question within the scope of the invention is preferably a reducing agent capable of reducing the NOx present in the exhaust gases of internal combustion engines. This is advantageously an ammonia precursor in aqueous solution. The invention gives good results with aqueous solutions of urea and in particular, eutectic water/urea solutions such as solutions of AdBlue®, the urea content of which is between 31.8 wt % and 33.2 wt % and which contain around 18% of ammonia. The invention may also be applied to urea/ammonium formate mixtures also in aqueous solution, sold under the trademark Denoxium® and which contain around 13% of ammonia. The latter have the advantage, with respect to urea, of only freezing from −35° C. downwards (as opposed to −11° C.), but have the disadvantages of corrosion problems linked to the release of formic acid.

The present invention may be applied to any internal combustion engine likely to generate NOx in its exhaust gases. It may be an engine with or without a fuel return line (that is to say, a line returning the surplus fuel not consumed by the engine to the fuel tank). It is advantageously applied to diesel engines, and in particular to vehicle diesel engines and particularly preferably to the diesel engines of trucks.

The system according to the invention comprises at least one tank intended for storing the additive. This tank may be made from any material, preferably one that is chemically resistant to the additive in question. In general, this is metal or plastic. Polyolefin resins, in particular polyethylene (and more particularly HDPE or high-density polyethylene), constitute preferred materials.

The pump of the system according to the invention is used to bring the additive solution to the pressure required for metering and spraying it. It comprises an inlet and an outlet. Various types of pumps may be suitable for the application: gear pump, piston pump, diaphragm pump, etc. A gear pump is particularly suitable. This pump can generate a direct flow where the additive circulates between a point located upstream of the pump and a point located downstream of the pump, or a reverse flow where the additive circulates between a point located downstream of the pump and a point located upstream of the pump. This pump may be located in the additive tank (with the advantage of forming, with it, a compact and integrated module) or, considering the corrosive environment, be located outside of the additive tank. Its constituent materials are preferably chosen from corrosion-resistant metals (especially certain grades of stainless steel and aluminium). The use of copper, even for connection components, is undesirable.

Preferably, in a mode of injection of the additive into the exhaust gases, the pump outlet pressure is regulated by a suitable device which may be a pressure regulator of any known type. A simple calibrated valve with a spring or a membrane gives good results. This device is generally located in a return line conveying the excess additive flow (difference between the delivery of the pump and that of the injector) to the tank.

The system according to the invention comprises at least two additive solution suction points. The first (which is only active in injection mode) is generally located at a higher level than the second and/or in a tank separate from that where the other suction point (active in drawing off mode only) is located. The present invention is advantageous for architectures where the two suction points are in separate volumes (either completely in two different tanks, or in two pockets of one and the same tank but which pockets are not connected (i.e. there is no continuity/communication between the liquid they contain) when the liquid level is low). It is particularly advantageous for architectures where the secondary suction point is located in a lower part (tank) which is filled by overflowing from the higher part (tank) where the main suction point is located.

According to the invention, a first suction point is connected to the pump inlet and is only active when the pump operates in injection mode and the second suction point is connected to the pump outlet and is only active when the pump operates in drawing off mode. In injection mode, the additive is pumped at the first suction point—also referred to as main suction point—located in the tank, it then circulates between the inlet and outlet of the pump, then it is injected into the injection line. In this mode, the pump operates in order to create a flow in a given direction (that of supplying with additive). In drawing off mode, the additive is pumped at a suction point, different from the main suction point, and also referred to as secondary suction point. In drawing off mode, the injector is preferably closed to avoid purging the injection line. In this mode, the pump can rotate in two opposite directions and thus generate reverse flows, i.e. reverse flows may be obtained by rotating the pump in the same direction but by using a suitable device, for example a 4/2-way valve described in Application WO 2006/064028 in the name of the Applicant, the content of which is, for this purpose, incorporated in the present application; or a system of valves and piping that produces the same effect.

In the particular case of a vehicle equipped with an SCR system comprising a tank having a main pocket and a secondary pocket, the main suction point is located in the main pocket and the secondary suction point is located in the secondary pocket.

In the particular case of a system comprising two tanks (a passive storage tank, which is not generally heated and an active tank, generally of smaller size and which is generally heated), the secondary suction point is located in the passive tank and the main suction point is located in the active tank. In such a system, in injection mode, the additive is pumped from the active tank and is sent to the exhaust gases whereas, in drawing off mode, the additive is pumped from the passive tank and is transferred to the active tank.

In the two particular cases above, it may be preferable to equip either the main pocket in the first case, or the active tank in the second case, with a tranquilization chamber which is intended to recover the additive sucked up either from the secondary pocket or from the passive tank. The tranquilization chamber thus makes it possible to store the additive in a confined space so as to have a minimum amount of additive necessary for the SCR system to operate even under conditions where the amount of additive available is reduced.

In the case of an SCR system comprising a tank having a main pocket and a secondary pocket, the drawing off mode may be actuated in order to fill the main pocket of the tank or, in the case where the SCR system comprises two tanks (a passive tank and an active tank) in order to transfer the additive from the passive tank to the active tank, for example under the following conditions:

on starting the vehicle, as long as a catalytic converter located in the exhaust line is not at temperature for enabling the reduction of NOx;

on stopping the vehicle, during the waiting period awaiting activation of the purge (while waiting for the catalytic convertor to be cold enough to allow air to be sucked through the SCR system);

during all the operating modes of the SCR system where the amount of additive precursor in the catalytic convertor is sufficient and does not require injection of additive during a given period (5 seconds for example);

as soon as the main pump outlet pressure falls during an injection mode, which would indicate that the main pocket of the tank is empty. The pollution control operation would then be interrupted for 20 to 30 seconds, in order to draw off a sufficient volume (for example with a flow rate of around 25 l/h) at a low point in the secondary pocket of the tank in order to resume the injection mode under normal conditions;

in the startup/stopping mode of the vehicle.

The system according to the invention generally comprises an injection line intended to bring the additive to an exhaust line of the engine and that, in order to do this, connects the pump and the injector, the pump and injector being separate devices placed in series from upstream to downstream (following the flow direction of the additive, i.e. from the tank (upstream) to the injector (downstream)).

Preferably, the system according to the invention also comprises a filter located between the tank and the pump that makes it possible to retain possible impurities present in the additive.

Also preferably, the return line comprises a calibrated orifice that makes it possible to adjust the level of pressure drops in the return line.

According to the invention, as already explained above, the pump and injector are separate devices located in the injection line between the additive storage tank and the exhaust pipe of the engine. According to one particularly advantageous variant, and as described in Application FR 2902136 in the name of the Applicant (the content of which is incorporated by reference in the present application), at least the pump is integrated into a base plate present on the tank, in the bottom of it. In a very particularly preferred manner, both the pump and the pressure-regulating device are integrated into this base plate, which is connected to the injector via an injection line. Thus, a particularly compact system is obtained.

According to one particular embodiment of the invention, the main pump can operate in pressure-regulating mode without a return line. In such a system, the main pump can operate in standby or idling mode when it does not inject additive into the exhaust gases. Additive circulates through the pump even outside of an injection or drawing off mode, and the pump is therefore not unprimed.

An SCR system that does not comprise a return line may be developed independently of the system according to the invention.

The main advantages linked to the use of a return line are the following:

facilitating the priming of the pump, injector closed. Indeed, it is necessary to avoid injecting urea into the catalyst outside of the injection phase;

instantaneously delivering the urea solution at the required pressure during the injection phase (pump operating continuously); and limiting the overheating of the urea solution and of the pump when the injector is closed.

However, the implementation of this line results in significant additional costs. Indeed, it requires the use of a non-return valve, a calibrated orifice and a supplementary heating line. Furthermore, it is necessary to continuously provide a flow in the line in order to keep the system pressurized during the injection phase. This flow results in a significant overconsumption of the pump and a reduction in its service life.

The elimination of the return line makes it possible to overcome these drawbacks. However, it involves controlling the problems linked to the undesirable injection of urea into the catalyst during the priming of the pump, to the overheating of the urea solution, and it should allow a rapid startup.

Hence, this invention relates to a system for storing an additive solution and injecting it into the exhaust gases of an internal combustion engine, said system comprising at least one tank for storing the additive and a rotary pump capable of generating a flow of additive to an injector, the whole assembly being controlled by a controller, according to which:

in injection mode (when the injector is open), substantially all of the flow generated by the pump is actually injected into the exhaust gases;

in standby mode (when the injector is closed), the rotational speed of the pump is maintained at a reduced value;

on moving from standby mode to injection mode, first the rotational speed of the pump is increased in order to attain (preferably in a very short time period (less than one second)) the required pressure then, secondly, the injector is opened.

The use of a digital controller that is very responsive and/or has a geometry involving a small amount of additive in the feed line connecting the pump and the injector, makes it possible to limit the delay between the command and the injection.

In the absence of a return line, the pump is preferably primed with the injector open in order to expel the air in the injection line. The opening time of the injector in the priming phase is preferably calibrated as a function of the pressure increase ramp and of the volume of air in the feed line in order not to inject urea solution into the catalyst during this phase.

The present invention also relates to a process for storing an additive solution and injecting it into an exhaust pipe of an internal combustion engine, said process consisting in conveying the solution stored in a tank to an injector using a pump equipped with an inlet and an outlet, two suction points connected respectively to the inlet and to the outlet of the pump, and in injecting this solution into the exhaust pipe, the process comprising:

an injection mode during which the pump is operated so as to circulate the solution between the inlet and the outlet of the pump, the solution is sucked up using the pump from the suction point connected to the pump inlet and the solution is injected into the exhaust pipe;

a drawing off mode during which the injector is closed, the pump is operated so as to generate a reverse flow, the solution is sucked up using the pump from the suction point connected to the pump outlet and the solution is sent into the tank; and a purge mode during which the injector is opened, the pump is operated so as to generate a reverse flow, the solution in the injector and in the injection line is sucked up using the pump.

Preferably, in purge mode, a higher pressure drop is created between the pump and the suction point connected to the pump outlet than between the injector and the main pump.

Figure 2:
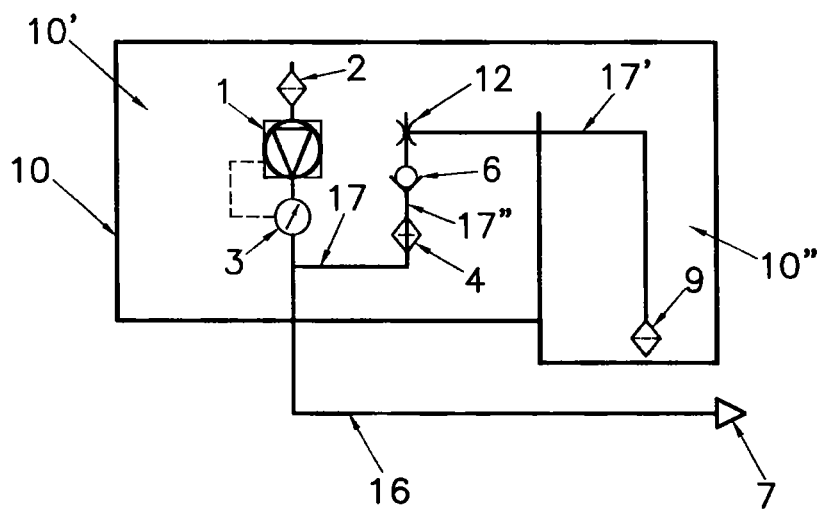
FIG. 2 illustrates an embodiment of the present invention with a tank comprising a main pocket, a secondary pocket and two suction points.

FIG. 1 illustrates a system according to the prior art whilst FIG. 2 illustrates an embodiment of the present invention.

Figure 3:
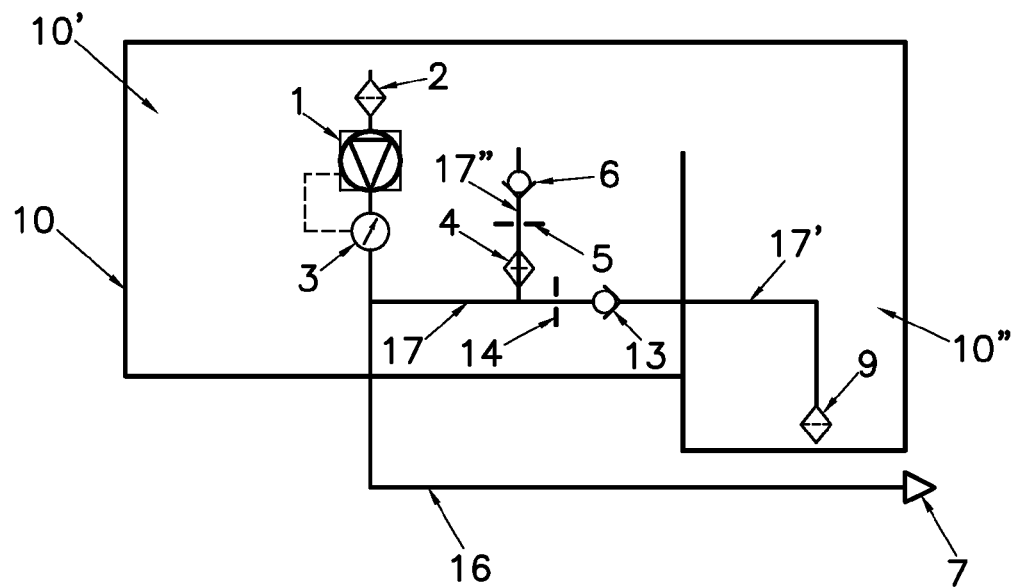
FIG. 3 represents one particular embodiment of an SCR system according to the invention comprising a tank similar to the one illustrated in FIG. 2.
Figure 4:
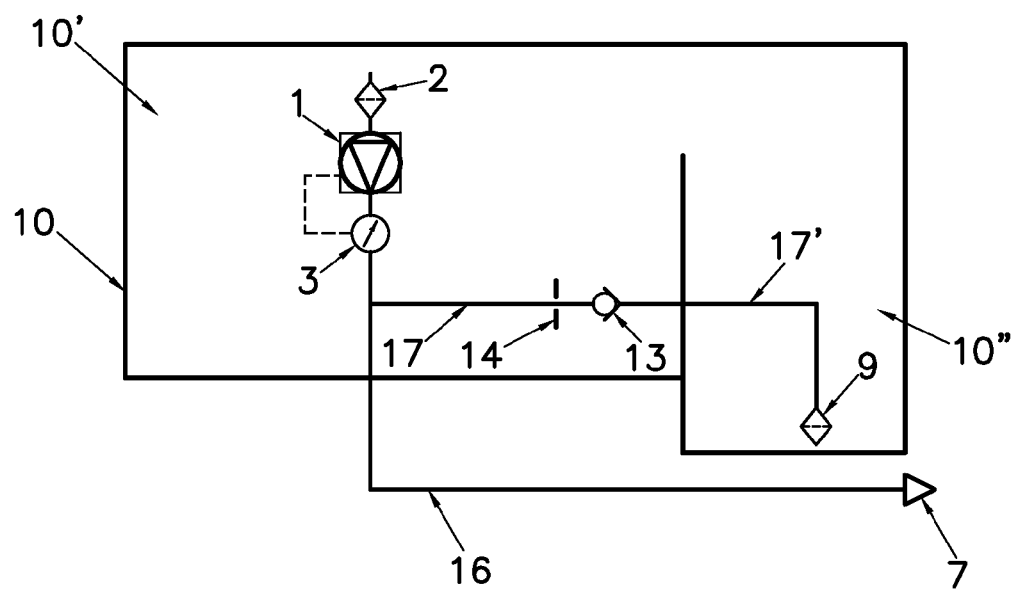
FIG. 4 illustrates a simplified variant of the system from FIG. 3.

The present invention is also illustrated in a non-limiting way, by FIGS. 3 and 4. In these figures identical numbers represent identical or similar components.

FIGS. 5 to 9 illustrate variants of the system represented in FIG. 2.

FIG. 1 represents a system according to the prior art comprising a storage (passive) tank (11) and an active tank (10) connected to one another, on the one hand, through a transfer pump (8) and, on the other hand, through an overflow line (15). This system also comprises a main pump (1) connected to an injector (7) via an injection line (16).

The tanks (10, 11) contain a reducing agent precursor solution, in this case: an aqueous AdBlue® solution containing 32.5% urea. The impurities possibly present are retained by a filter (2) in the tank (10) and by a filter (9) in the tank (11). The pump (1) allows the solution to be withdrawn from the tank and the liquid to be brought to the pressure needed for the required spraying through the injector (7). The pump (1) makes it possible to convey more than the amount of additive required to the injector (7), the excess produced by the pump (1) being returned to the tank (10) via a return line (17, 17"). The outlet pressure of the pump (1) is regulated by a pressure regulator (3).

The return line (17, 17") comprises a filter (4), a calibrated orifice (5) and a non-return valve (6).

In the system from FIG. 1, the transfer pump (8) makes it possible to pump additive into the passive tank (11) and to transfer it to the active tank (10) so as to maintain a sufficient amount of additive in the active tank (10). The overflow line (15) makes it possible to transfer additive from the tank (10) to the tank (11) in the cases where the level of additive in the tank (10) reaches or exceeds a given filling level and to fill the passive tank via the active tank.

The system from FIG. 2 illustrates a tank (10) comprising a main pocket (10') and a secondary pocket (10") which extends to a lower level than the main pocket (10'). The system comprises two suction points, respectively located in the main pocket (10') and in the secondary pocket (10"), the suction point in the secondary pocket (10") being located at a lower level than the suction point located in the main pocket (10'). As in the system from FIG. 1, the main pump (1) pumps additive from the tank (10) via the filter (2) and injects it partly into the injection line (16) leading to the injector (7). The outlet pressure of the pump (1) is regulated by means of the pressure regulator (3).

This system comprises a return line (17, 17") which is equipped with a filter (4), a non-return valve (6) and a jet pump (12). The latter is fed by additive which is sent by the pump (1) into the return line (17, 17") and it sucks up additive from the low point of the secondary pocket (10") through a filter (9) and via a line (17').

FIG. 3 represents one particular embodiment of an SCR system according to the invention.

This system comprises a tank (10) similar to the one illustrated in FIG. 2.

This system comprises a return line (17, 17") which is equipped with a filter (4), a calibrated orifice (5) and a non-return valve (6). In this system, the low suction point located in the pocket (10") is connected via a filter (9), a non-return valve (13), a calibrated orifice (14) and the line (17) to the outlet of the main pump (1).

During operation, the main pump (1) has an injection mode, a drawing off mode and a purge mode.

In injection mode, the main pump (1) pumps additive from the main pocket (10') through a filter (2) and injects it into the injection line (16), the excess additive circulating in the return line (17). The non-return valve (13) is placed in the line (17') so that the excess additive which circulates in the line (17) cannot circulate in the line (17') and therefore passes into the filter (4), then through the calibrated orifice (5) and finally through the non-return valve (6) in order to be returned to the main pocket (10') of the tank (10).

In drawing off mode, i.e. when the pump is operated so as to generate a reverse flow, additive is sucked up from the low point in the pocket (10"), through the filter (9), via the line (17'), then through the calibrated orifice (14), in the line (17), through the pump (1) and is sent to the pocket (10') via the filter (2). In this mode, the orifice (14) is calibrated so that the pressure drops in the line (17, 17') are reduced and consequently the flow of additive sucked up from the pocket (10") is increased. In this mode, there is no additive circulating in the branch (17"), the non-return valve (6) only allowing a return of additive to the main pocket (10') and not allowing suction through the line (17").

FIG. 4 illustrates a simplified variant of the system from FIG. 3. In this system, there is no return line, the main pump (1) being able to operate in pressure-regulating mode without requiring return of additive to the main pocket (10').

All the functions of the system are electronically controlled.

Figure 5:
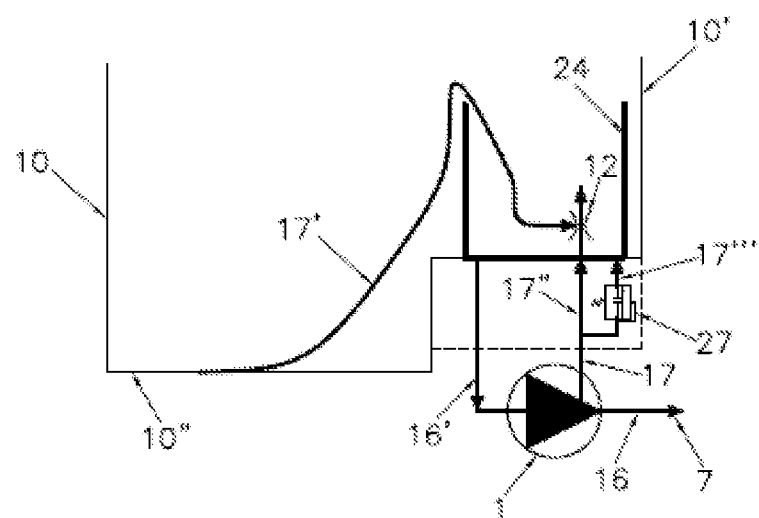
FIGS. 5 to 9 illustrate variants of the system represented in FIG. 2.

The system from FIG. 5 illustrates a tank (10) comprising a main pocket (10') and a secondary pocket (10") which extends to a lower level than the main pocket (10'). The main pocket (10') comprises a tranquilization chamber (24) from which additive is drawn off by a main pump (1) through a line (16') and is then sent partly through an injection line (16) to an injector (7). The tranquilization chamber (24) makes it possible to store a sufficient amount of additive to supply the line (16').

This system comprises a return line (17, 17") which is equipped with a jet pump (12). The latter is fed by additive which is sent by the pump (1) into the return line (17, 17") and it sucks up additive from the low point of the secondary pocket (10") via a suction line (17'). The return line (17, 17") is also equipped with a discharge line (17'") parallel to the portion (17") of the return line (17, 17"). The discharge line (17'") makes it possible to limit the pressure in the jet pump (12), for example in case the additive freezes or in case additive crystals appear which would be capable of damaging the operation of the jet pump (12). The discharge line (17'") is also equipped with a system (27) that creates, in the discharge line (17'"), when the jet pump (12) is operating, a restriction (therefore a pressure drop) that is greater than in the portion (17") of the return line (17, 17"), such as, for example, a nozzle or a valve. When the jet pump (12) cannot operate (see above), the pressure drop created by the system (17) is then lower than in the portion (17") and the additive is sent directly to the tranquilization chamber (24) without passing through the jet pump (12) so as not to disrupt the operation of the main pump (1).

As illustrated in FIG. 5 using a dotted line, the discharge line (17'") and the system (27) may be located either on the outside of the tank (10), or on the inside of the latter (dotted line situation).

Figure 6:
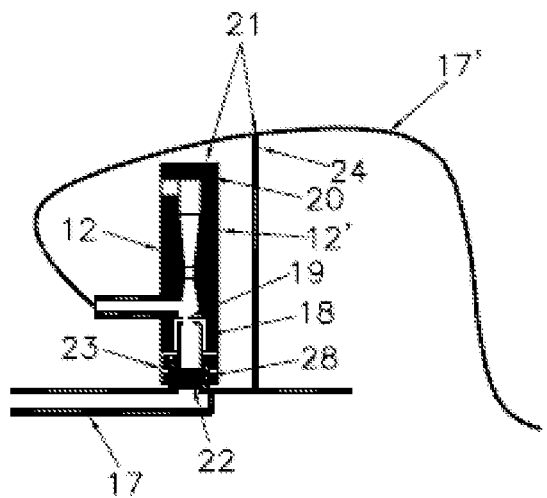

The jet pump (12), which is illustrated in greater detail in FIG. 6, comprises a body (12'), a casing (20) and an inlet component (23) of variable length, this being in order to be able to adapt a standard jet pump to various architectures. A flow of additive is sent by the main pump (1) through the return line (17) (the portion (17") is not represented) to the jet pump (12) so as to prime the latter and so that additive is sucked through the suction line (17') from a suction point located for example in the pocket (10") of the tank (10) (not represented in FIG. 6). The inlet component (23) is fastened in a leaktight manner with a flange (28) located at the base of the tranquilization chamber (24). The flange (28) is equipped with a non-return valve (22) so as to prevent additive from flowing from the jet pump (12) to the main pump (1).

So as to adjust the flow of additive at the inlet of the jet pump (12) and to prevent it from operating with too high a flow rate, the body (12') is provided with a restriction (19), the opening of which is calibrated. The restriction (19) makes it possible to obtain a greater back pressure upstream of the jet pump (12). For example, for a main pump (1) which delivers additive at around 5 bars in the return line (17, 17"), the restriction (19) is calibrated so that the pressure at the inlet of the jet pump (12) is limited to around 1 to 1.5 bars.

Also represented in FIG. 6 are two points (21) where it is intended to fasten the suction line (17') respectively to the top of the tranquilization chamber (24) and to the case (20) of the jet pump (12).

FIGS. 7a to 7d represent a 3D view respectively of the jet pump (12) equipped with its mounting casing (20) (7a and 7b), of the mounting casing alone (7c) and of the assembly mounted on a tranquilization chamber.

Figures 7A, 7B, 7C, 7D:
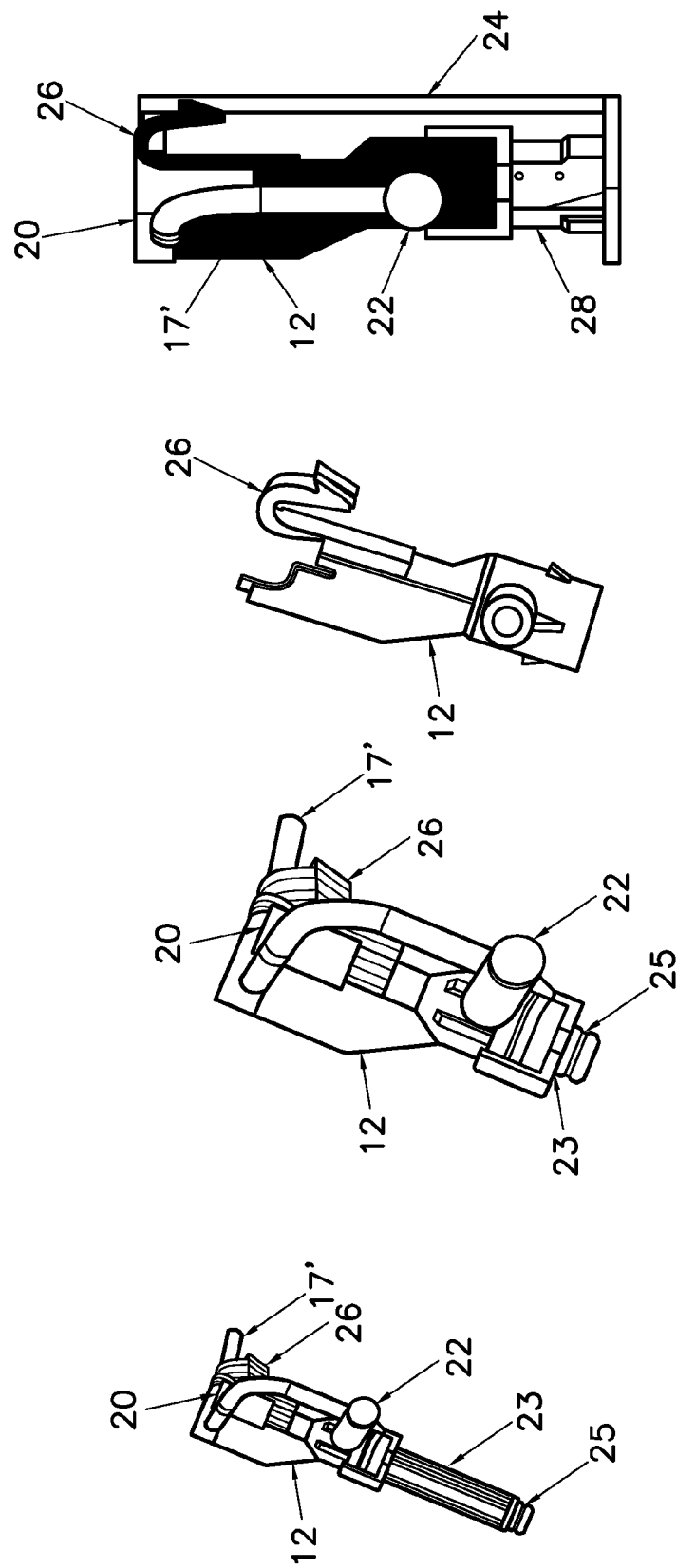

FIGS. 7a and 7b represent the jet pump (12) as connected to the suction line (17') with the inlet component (23) shown with two different lengths. In both cases, one end of the inlet component (23) is provided with a seal (25) that ensures peripheral sealing with the flange (28) (not represented) when the inlet component (23) is connected with the flange (28).

The casing (20) of the jet pump (12) is provided with a hook that enables the jet pump (12) to be fastened to the tranquilization chamber (24). As illustrated in FIG. 7d, the jet pump (12) is fastened to the tranquilization chamber (24) via the inlet component (23) on the flange (28) and via the hook (26) of the mounting case (20) on the tranquilization chamber (24). The length of the inlet component (23) is adapted so that the jet pump (12) is fastened to the tranquilization chamber (24) whatever the height of the flange (28).

Figure 8:
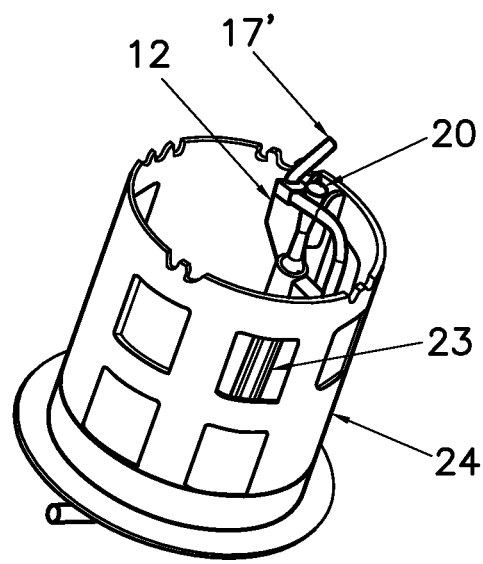

FIG. 8 illustrates the jet pump (12) assembled to the tranquilization chamber (24) and connected to the suction line (17'). The latter may be made of a material that provides the line (17') with sufficient flexibility in order to give it a desired profile between a suction point located in the tank (10) and the jet pump (12), and with sufficient stiffness so that the suction line (17') returns to its original position after a deformation due, for example, to the additive freezing in the tank (10). Hydrolysed PA-12 gives good results.

In order to overcome the same problem (freezing), the end of the suction line (17') where the additive is sucked up from the pocket (10") of the tank (10), may be free and may not be (as is often the case) fastened to the bottom of the tank (10), for example by means of a clip. This also makes it possible to avoid welding the clip to the bottom of the tank (10) and assembling the end of the suction line (17') with the clip. Still in order to overcome the problems generated by freezing, it may be advantageous to provide the suction line (17') with a heating system, in order to accelerate the starting of the jet pump (12). And finally, in order to protect the jet pump from possible impurities contained in the tank, the suction line (17') may advantageously be provided with a filter.

Figure 9:
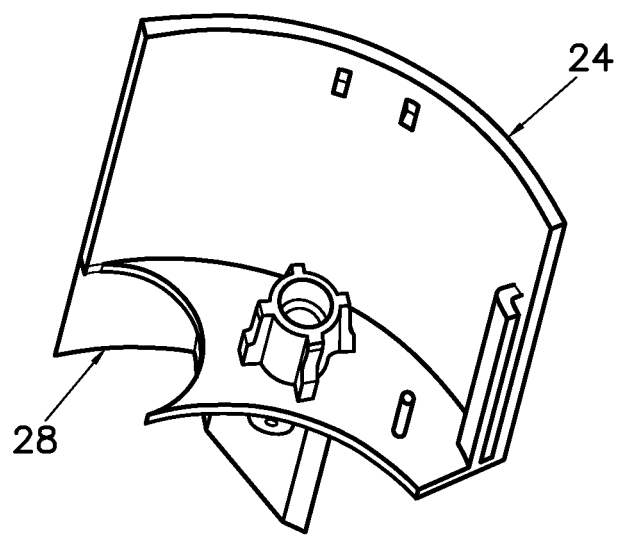

FIG. 9 represents the part of the tranquilization chamber (24) comprising the flange (28) as an integrated part, molded in one piece with it.

The invention claimed is:

1. A system for storing an additive solution and injecting it into the exhaust gases of an internal combustion engine, said system comprising:
    at least one tank for storing the additive,
    one pump equipped with an inlet and an outlet and that generates a direct flow in an injection mode or a reverse flow in a drawing off mode,
    at least two additive solution suction points, and
    an injector,
    a first suction point is connected to the pump inlet that is only active when the pump operates in the injection mode,
    a second suction point is connected to the outlet of the pump that is only active when the pump operates in the drawing off mode, the second suction point being connected to the outlet of the pump via a calibrated orifice that is contained within the at least one tank,
    a main pocket that contains the first suction point,
    a secondary pocket that contains the second suction point, and
    a return line that discharges into said main pocket in said injection mode when said additive is injected from said injector.

2. The system according to claim 1, further comprising a pressure-regulating device, which is a calibrated valve with a spring or a membrane.

3. The system according to claim 1, wherein the at least one tank includes a passive tank and an active tank, and
    wherein the second suction point is located in the passive tank and the first suction point is located in the active tank.

4. The system according to claim 1, wherein the calibrated orifice is calibrated so that pressure drops in the return line in the drawing off mode are reduced and a flow of the additive sucked up from the secondary pocket via the second suction point is increased.

5. The system according to claim 1, wherein the second suction point is connected to the outlet of the pump via a filter, a non-return valve and the calibrated orifice.

6. The system according to claim 1, wherein the calibrated orifice is a first orifice and the return line is equipped with a second calibrated orifice.

7. The system according to claim 1, wherein the pump is in the at least one tank.

8. The system according to claim 1, wherein the pump is operated in a purge mode in which the injector is opened, the pump being operated so as to generate the reverse flow, and the solution in the injector and in an injection line is sucked up using the pump and the calibrated orifice.

9. The system according to claim 1, wherein the at least one tank includes the main pocket and the secondary pocket.

10. The system according to claim 9, wherein the main pocket includes a tranquilization chamber.

* * * * *